D. S. SEYMOUR.

APPARATUS FOR FEEDING AND SEWING FILLED SACKS.

APPLICATION FILED DEC. 22, 1917.

Reissued Mar. 5, 1918.

14,443.

5 SHEETS—SHEET 1.

Witness

Inventor

Dudley S. Seymour

By Sturtevant & Simpson

Attorneys

D. S. SEYMOUR.

APPARATUS FOR FEEDING AND SEWING FILLED SACKS

APPLICATION FILED DEC. 22, 1917.

Reissued Mar. 5, 1918.

14,443.

5 SHEETS—SHEET 2.

Witness

Inventor

Dudley S. Seymour

By Sturtevant & Mason

Attorneys

D. S. SEYMOUR.

APPARATUS FOR FEEDING AND SEWING FILLED SACKS.

APPLICATION FILED DEC. 22, 1917.

Reissued Mar. 5, 1918.

14,443.

5 SHEETS—SHEET 3.

Inventor

Dudley S. Seymour

Witness

By Sturtevant Mason

Attorneys

D. S. SEYMOUR.

APPARATUS FOR FEEDING AND SEWING FILLED SACKS.

APPLICATION FILED DEC. 22, 1917.

Reissued Mar. 5, 1918. 14,443.

5 SHEETS—SHEET 4.

Inventor

Dudley S. Seymour

Witness

By Sturtevant & Mason

Attorneys

D. S. SEYMOUR.

APPARATUS FOR FEEDING AND SEWING FILLED SACKS.

APPLICATION FILED DEC. 22, 1917.

Reissued Mar. 5, 1918.

14,443.

5 SHEETS—SHEET 5.

Witness

Inventor:

Dudley S. Seymour

By Sturtevant & Mason

Attorneys

UNITED STATES PATENT OFFICE.

DUDLEY S. SEYMOUR, OF OAK PARK, ILLINOIS, ASSIGNOR TO UNION SPECIAL MACHINE COMPANY, OF CHICAGO, ILLINOIS, A CORPORATION OF ILLINOIS.

APPARATUS FOR FEEDING AND SEWING FILLED SACKS.

14,443. Specification of Reissued Letters Patent. Reissued Mar. 5, 1918.

Original No. 1,210,218, dated December 26, 1916, Serial No. 536,765, filed January 6, 1910. Application for reissue filed December 22, 1917. Serial No. 208,504.

*To all whom it may concern:*

Be it known that I, DUDLEY S. SEYMOUR, a citizen of the United States, residing at Oak Park, in the county of Cook, State of Illinois, have invented certain new and useful Improvements in Apparatus for Feeding and Sewing Filled Sacks, of which the following is a description, reference being had to the accompanying drawing and to the letters and figures of reference marked thereon.

My invention relates to an organized apparatus for feeding and sewing filled sacks, and in general is of the type known as the Union Special filled bag sewing apparatus, as embodied generally in patent to Bigelow, No. 875,314, of December 31st, 1907, and more specifically in patent of Foster, No. 875,339, of December 31st, 1907. In brief and without enumeration of detail, this type of apparatus embodies a supporting framework, an adjustable table over which runs a conveyer belt for the filled bags, which conveyer belt delivers the bags successively to a stitch-forming mechanism which overhangs the edge of the framework. After the sewing of the mouth of a bag has been performed, the chain of stitching between it and the succeeding bag is severed by cutting mechanism, of which any one of various types may be employed. The conveyer belt is adjustable up and down to accommodate varying sizes of bags, this adjustment being effected without varying the operative connections which drive the conveyer belt and the stitch forming mechanism. This type of machine includes also a guiding rail for the body of the bag to rest against, in order that it may accurately register with and be fed to the stitch forming mechanism.

With this general statement as to the type of machine at present in use, it may be stated that the present invention has for its object to improve the mechanical structure of such apparatus with the idea of securing greater nicety of adjustment, greater facility of handling, and increased production.

The invention, therefore, consists, first, in the provision of an adjustment of the sewing machine head carrying the stitch forming mechanism, whereby within certain ranges of bag sizes, such adjustment will suffice without making use of the more extensive range of adjustment permitted the conveyer.

Secondly, the invention consists in combining with the cutting apparatus for severing the chain of stitches, means for causing the bag after it has passed the stitch forming mechanism, to be operated to draw the chain of stitching between it and the next bag taut, and laterally into the line of the severing device, to enable the latter to more effectually sever the threads.

Thirdly, for the purpose just above mentioned it consists in providing two guide rails in different vertical planes, coöperating with a tilter board beneath the conveyer belt, whereby when the bag leaves the first guide rail, it will be tilted laterally against the rear guide rail, and thus draw the chain of stitching taut, and into the line of action of the severing device.

Finally, the invention consists in the various details of construction and arrangement of parts, whereby the results aimed at are accomplished in a simple and practical manner.

The invention is illustrated in the accompanying drawings, in which:—

Figure 8:
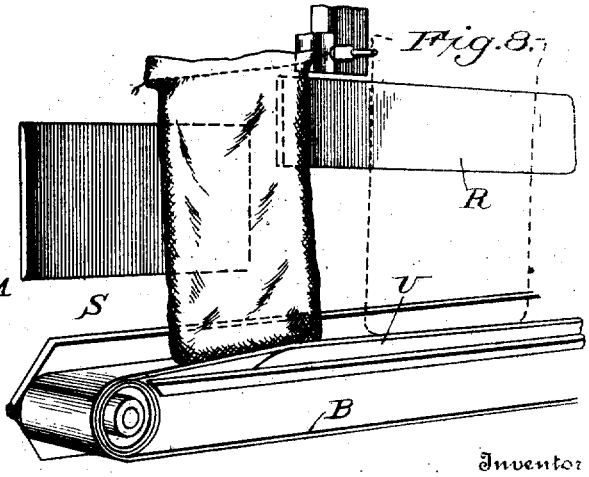
Figure 7:
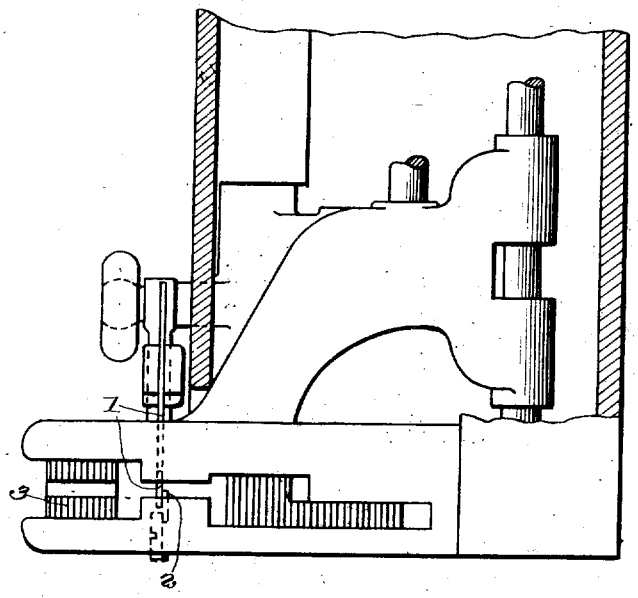
Figure 7A:
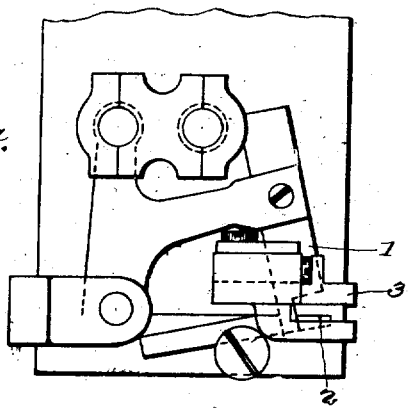
Figure 7B:
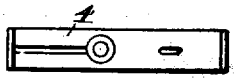

Figs. 7 and $7^a$ are front and side views of the cutting or severing mechanism;

Fig. $7^b$ is a detail view of the presser foot;

Fig. 8 is a left hand perspective view, showing the manner of manipulation of the bag, to draw the thread taut and into the path of the cutting mechanism.

It will be understood that so far as the stitch forming mechanism is concerned, it is intended to use the Union Special cylinder type of machine, either as shown in patent to Onderdonk, No. 547,675, or preferably one containing the features set forth in my application filed June 12, 1909, No. 501,817;

the same having added to it the mechanism herein shown for cutting or severing the chain of stitches between two consecutive bags. So far, however, as the particular cutting or severing mechanism, with its cooperative arrangement and relation to the sewing machine feeding mechanism is concerned, I do not herein claim it, as it forms the subject matter of an application filed by me of even date herewith, Serial No. 536,766. It is only herein illustrated as a suitable form of severing mechanism, and one which lends itself to coöperation with the means devised by me to cause the bag after it has been sewed, to shift to such position that the chain of stitching will be stretched taut and drawn into position where the special form of severing device will be effective. Furthermore, I do not claim herein either broadly or specifically, a means for shifting the position of the bag after the mouth thereof has been stitched, to draw the chain taut that a cutting or severing device may more readily clip it off, as that is not of my invention, the latter as above stated, so far as this point is concerned, residing in the means for shifting the bag, not only to draw the chain of stitching taut, but to draw it laterally into the path of action of my special form of severing device.

Referring now to the drawings, the supporting framework A is of the usual iron construction, having its legs provided with caster wheels. The conveyer belt B, the means for driving and supporting the conveyer belt, the sliding worm gear, the worm wheel, and various other parts, are similar in general construction and mode of operation to the corresponding features shown in the Foster patent above referred to; the conveyer and its supporting table C, being similar to that shown in the Bigelow patent referred to. Certain changes, however, have been herein embodied, which may be mentioned.

The vertical shaft D is driven by the electric motor E, carried by the framework. It is journaled in bearings at the base and top of the framework. It extends above the top of the framework, and drives the belt pulley *a*, belted to the usual belt pulley *b* of the sewing machine. This vertical shaft D carries below the top of the framework the worm wheel splined on it, and engaging the worm gear, on the shaft with the sprocket gear *c* which has a sprocket chain connection with one of the conveyer belt pulleys. A usual foot-actuated clutch mechanism is used for starting and stopping the movement of the shaft D.

The bracket carrying the conveyer belt pulleys, has guiding ways on the front legs of the framework, and the entire conveyer belt mechanism is raised or lowered by means of screw shafts F, engaging the bracket, carrying at their upper ends horizontal beveled gears *d*, meshing with vertical beveled gears *e* on the hand crank shaft *f*. By this construction, it will be seen that a simple arrangement is provided for raising and lowering the conveyer belt to accommodate sacks of varying heights. This adjustment of the conveyer belt is necessary in an apparatus designed to operate upon bags of practically all sizes, because it permits a wide range of adjustment. It frequently happens, however, that after the approximate adjustment of the conveyer for bags of certain size has been accomplished, by raising or lowering the said conveyer, a somewhat greater degree of nicety is required in the location of the line of stitching with respect to the bag mouth or series of bags varying only slightly in size are to be successively sewed on the machine. To this end, I have arranged for an adjustment within certain limits, of the sewing head itself. Bolted to the top of the supporting framework A, is the standard G, formed as shown with the side webs *g*, and having ways *h*, in which fit gibs *i*, secured to the bracket I, upon which bracket is adjustably secured by slot *j* and screw *k* adjustment, the machine bracket J, formed with the pad upon which the sewing machine base or standard is supported.

The bracket I has a projecting arm *m* sleeved upon the vertical shaft D, and has bolted to it a plate K to which is secured the bolt *n* to which is pivoted one end of a link *o* pivoted at its opposite end to the hand lever L, which passes through a slit in the web *g*, and is pivoted to the inside of the standard G.

It will be seen that by manipulation of the lever L, the bracket I and with it the machine supporting bracket J is moved up and down, and the height of the sewing machine thus adjusted.

Figure 1:
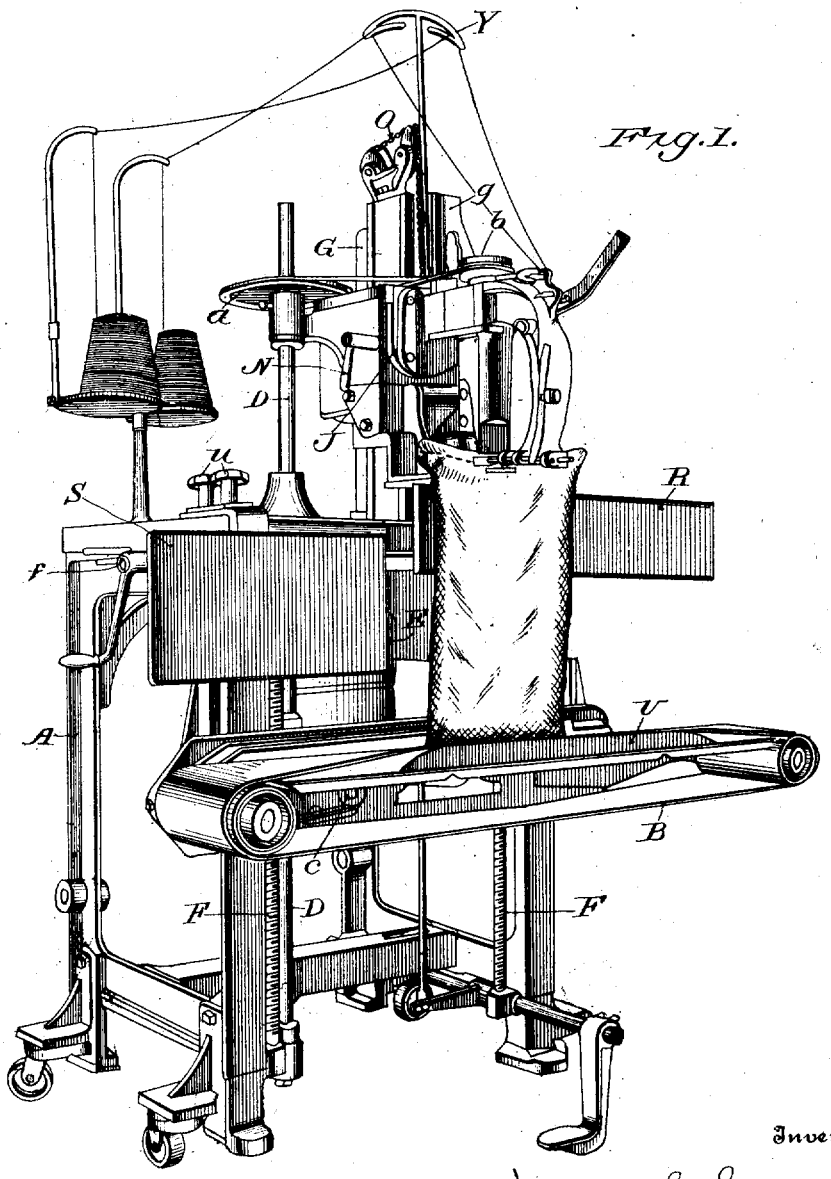
Figure 1 is a front left hand perspective view of an organized filled bag sewing apparatus embodying my invention.
Figure 2:
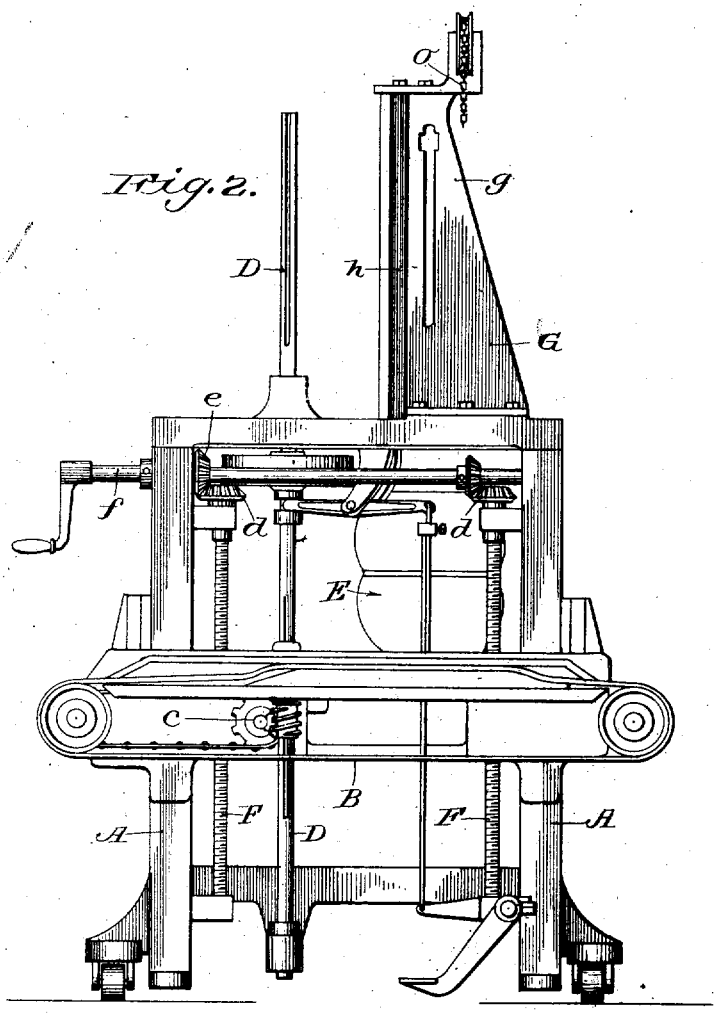
Fig. 2 is a side view of the same, with various parts removed.
Figure 3:
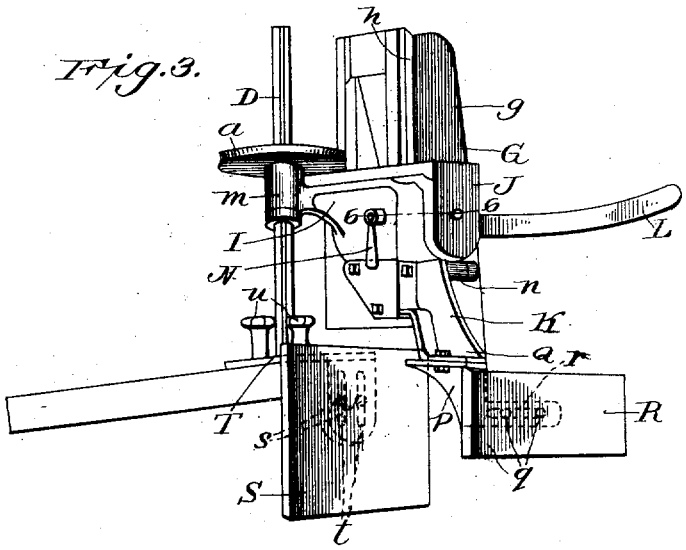
Fig. 3 is a left hand perspective of the sewing head supporting bracket, with the guide rails, with the sewing head removed.
Figure 4:
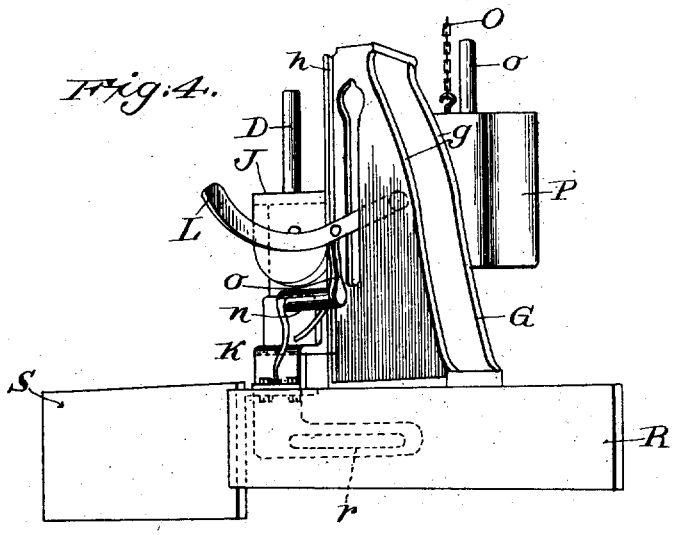
Fig. 4 is a right hand perspective view, similar to Fig. 3.
Figure 5:
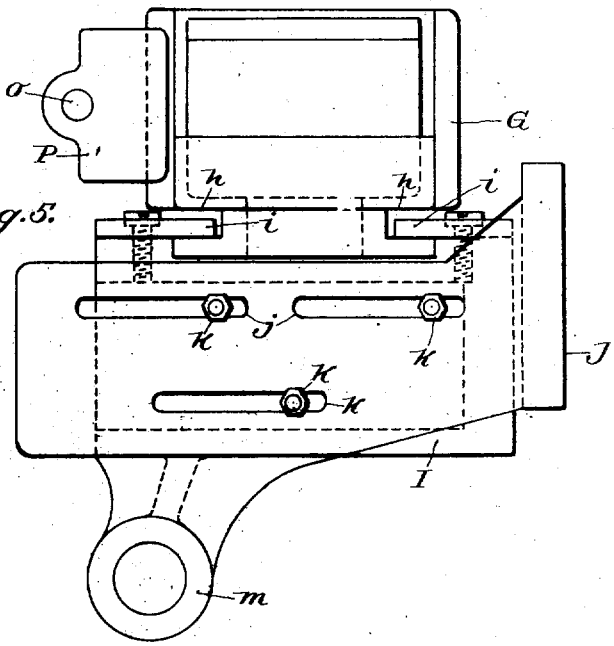
Fig. 5 is a plan view of Fig. 3.
Figure 6:
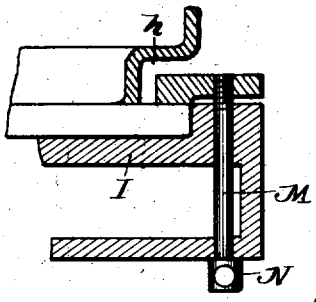
Fig. 6 is a detail section on line 6—6, of Fig. 3.

The bracket I may be clamped in any position of adjustment, by means of the clamping screw M and hand lever N, shown in Fig. 6. A chain O attached at one end to the machine bracket and running over pulleys on top of the standard G, is secured at the other end to a counterweight P guided on a rod *o'*. This lateral adjustment of the sewing head permits the stitching point of the sewing head to be shifted transversely of the filled bag being stitched, so as to bring the stitching point centrally over the filled bag. If the bag is of greater width than the conveyer, the mouth of the bag is offset from the center line of the conveyer, but by means of this adjustment, the sewing head may be shifted and the stitching point brought centrally over the bag, and at the same time the needle always reciprocates in a horizontal plane for various adjusted positions of the sewing head.

Extending downward from the bracket plate K is an angle arm Q, to which is adjustably bolted the bracket *p*, to the lower arm of which is adjustably secured the guiding rail for the filled bag. Adjustment of the guiding rail transversely of the conveyer is permitted, by reason of the adjustment of the bracket *p*, upon the arm Q, and adjustment longitudinally of the conveyer belt is permitted by the screws *q* and longitudinal slot *r*. It will thus be seen that as the sewing machine head is adjusted, the guiding rail R is also adjusted vertically, and as before stated, this adjustment of sewing machine head may be all that is necessary for use on an apparatus of this character, if there is no great disparity in the sizes of bags to be sewed, but even if there is such disparity, this adjustment of the head permits of a greater degree of nicety of adjustment of the sewing mechanism with respect to the mouth of the bag, than if only the adjustment of the conveyer belt were made use of.

The sewing machine has attached to it a vertical thread guide Y.

The guiding rail R terminates preferably a short distance in rear of the stitching mechanism, and is substantially in such a line that it guides the mouth of the bag properly to the stitching mechanism. In rear of the guiding rail R in the direction of feed of the conveyer, and in a vertical plane behind the said rail R, is a second guiding rail S, vertically adjustable by the screw *s*, and slot *t*, adjustment, on the bracket T, which bracket is horizontally adjustable by means of hand screws *u* on the top of the supporting framework. It will be understood that these two guiding rails form, in effect, a two-part rail, of which one part guides the bag up to the stitching mechanism, and the other part guides the bag after it leaves the stitching mechanism.

Between the top of the conveyer belt B and its supporting table C is placed a board U, which inclines downwardly and rearwardly at a point about beneath the stitching mechanism, the purpose of such being that when a bag mouth has been stitched, the weight of the bag as it leaves the substantially level parts of the board U will cause it to tilt forwardly and sidewise against the guide rail S, or in other words, to topple over against the guide rail S, thus drawing taut the chain of stitching and drawing it also into the path of action of a cutting or severing mechanism, which *per se*, forms no part of the present invention as hereinbefore stated. This severing mechanism is shown in Fig. 7, and briefly embodies a movable cutting blade 1, operated from the feed-operating devices of the machine, coöperating with a stationary blade 2, and operating to sever the chain of stitching at a point back of the rear feed dog 3, which is split centrally, as is also the coöperating part of the presser foot 4, to allow the bag in its toppling over movement to draw the chain of stitching between the two parts of the rear feed dog, and thus into the line of movement of the cutting blade 1.

From the above it will be noted that the severing members 1 and 2 are located in the rear of the plane of travel of the mouth of the bag being stitched which is engaged by the feed dog 3. These severing members being operated by the feed operating devices of the machine move continuously. Said severing devices as clearly shown in Fig. 7[a] have a receiving throat which opens toward the plane of travel of the mouth of the bag being stitched which passes across the work support of the sewing machine and is engaged, as above noted by the feed dog 3. When the bag is tilted rearwardly, the connecting chain of stitches between the stitched bag and the sewing mechanism will be carried into the receiving throat of the severing devices.

While, as before stated, I make no claim herein to the cutting mechanism *per se*, the same being claimed in my application above referred to; nor broadly to the providing of means to tilt or topple the bag after the stitching has been performed to automatically tighten the chain of stitching to render the severing action thereon more effective, as that is the invention of another party; nevertheless, in addition to the various details looking to the making of a better and more effective apparatus for the purpose of sewing filled bags, I believe I am the first to provide means for feeding and sewing the mouth of a filled bag, and after the sewing has been accomplished, to shift the bag laterally to tighten the chain of stitching, and at the same time draw it into the line of action of a severing device.

Having thus described my invention, what I claim as new and desire to secure by Letters Patent, is:—

1. In an organized apparatus for feeding and sewing filled bags, a supporting framework, a sewing head overhanging the edge thereof, means for supporting the sewing head, means for raising and lowering it and a conveyer belt with means for raising and lowering it and means for driving the stitch forming mechanism of the sewing head and for driving the conveyer belt.

2. In an organized apparatus for feeding and sewing filled bags, a supporting framework, a sewing head overhanging the edge thereof, means for supporting the sewing head, means for raising and lowering it and for holding it in position and a conveyer belt with means for raising and lowering it and means for driving the stitch forming mechanism of the sewing head and for driving the conveyer belt.

3. In an organized apparatus for feeding and sewing filled bags, a supporting framework, a sewing head overhanging the edge thereof, means for supporting the sewing head, means for raising and lowering it and for clamping it in position, and a conveyer belt with means for raising and lowering it, and means for driving the stitch forming mechanism of the sewing head and for driving the conveyer belt.

4. In an organized apparatus for feeding and sewing filled bags, a supporting framework, a sewing head overhanging the edge thereof, means for supporting the sewing head, means for raising and lowering it and for holding it in position, a conveyer belt with means for raising and lowering it, and a single upright driving shaft, a bracket supporting the sewing head and having a portion sleeved on said shaft, said shaft also carrying a worm gear, and connections between the shaft and the sewing head for driving the sewing mechanism, and between the worm gear and the conveyer belt for driving the latter.

5. In an organized apparatus for feeding and sewing filled bags, a supporting framework, a sewing head overhanging the edge thereof, means for supporting the sewing head including a bracket, means for raising and lowering said bracket, a conveyer belt with means for raising and lowering it, and a single upright driving shaft, said bracket being vertically movable on said upright shaft, and said conveyer belt also vertically movable with respect thereto, with means for driving the sewing mechanism and for driving the conveyer belt.

6. In an organized apparatus for feeding and sewing filled bags, a supporting framework, a standard thereon, a bracket vertically movable on said standard, a sewing head carried by said bracket, and a lever pivoted to the standard, and having a link connection with the bracket for effecting the vertical movement of said bracket.

7. In an organized apparatus for feeding and sewing filled bags, a supporting frame, a conveyer mounted on said supporting frame and projecting forwardly therefrom, a sewing head mounted on said supporting frame and overhanging said conveyer, means for adjusting said sewing head vertically on the frame including a lever located above said conveyer projecting toward the front of the machine to a position convenient for the hand of the operator, and means for controlling the sewing head and the conveyer including a lever mounted on the supporting frame and projecting toward the front of said frame to a position convenient for the foot of the operator.

8. In an organized apparatus for feeding and sewing filled bags, a supporting framework, a sewing head overhanging the same, a conveyer mechanism beneath the sewing head, means for raising and lowering the sewing head and a bag guiding rail movable with the sewing head.

9. In an organized apparatus for feeding and sewing filled bags, a supporting framework, a sewing head overhanging the same, a conveyer mechanism beneath the sewing head, means for raising and lowering the sewing head, a bag guiding rail movable with the sewing head, and means for adjusting the guiding rail.

10. In an organized apparatus for feeding and sewing filled bags, a supporting framework, a sewing head overhanging the same, a conveyer mechanism beneath the sewing head, means for raising and lowering the sewing head, a bag guiding rail movable with the sewing head, and a second guiding rail attached to the supporting framework, and in a different vertical plane from the first guiding rail.

11. In an apparatus of the character described, the standard, the bracket sliding thereon, the sewing head supporting bracket on said first bracket, and the guiding rail connected to the sliding bracket.

12. In an apparatus of the character described, a standard having ways, a bracket having gibs engaging said ways, a sewing head supporting bracket horizontally adjustable on said first bracket and means for raising and lowering the first bracket and with it the second bracket and sewing head.

13. In an apparatus of the character described, the standard having ways, the bracket having gibs engaging said ways, a sewing head supporting bracket horizontally adjustable on said first bracket, and a lever mechanism for raising and lowering the first bracket and with it the second bracket and sewing head.

14. In a filled bag sewing apparatus, a framework therefor, a sewing head, a conveyer, a guiding rail for the bags, one part of which is arranged farther from the edge of the framework than the other whereby one part guides the bag up to the stitching mechanism, and the other part guides said bag after it leaves the stitching mechanism.

15. In a filled bag sewing apparatus, a framework therefor, a sewing head, a conveyer, a guiding rail for the bags formed in two parts, one of which is arranged to one side and in front of the other and upon opposite sides of the sewing head whereby one part guides the bag up to the stitching mechanism, and the other part guides said bag after it leaves the stitching mechanism.

16. In a filled bag sewing apparatus, a framework therefor, a conveyer, and a movable sewing head, a guiding rail carried by said framework and adjustable thereon, a second guiding rail carried by said sewing head and adjustable thereon.

17. In an organized apparatus for feeding and sewing filled bags, a supporting framework, a sewing head overhanging the same, a conveying mechanism beneath the sewing head, a bag guiding rail, a cutting apparatus, and means for shifting the lateral position of the bag as it leaves the guiding rail, whereby the chain of stitching is drawn taut, and into the path of the cutting apparatus, to sever the chain.

18. In an organized apparatus for feeding and sewing filled bags, a supporting framework, a sewing head overhanging the same, a conveying mechanism beneath the sewing head, a bag guiding rail, a cutting apparatus, means for shifting the lateral position of the bag as it leaves the guiding rail, to draw the chain of stitching taut, and into the path of the cutting apparatus to sever the chain, and a second guiding rail to catch and support the bag after it leaves the first guiding rail.

19. In an organized apparatus for feeding and sewing filled bags, a supporting framework, a sewing head overhanging the same, a conveying mechanism beneath the sewing head, a bag guide rail, a cutting apparatus, and means for tilting the bag as it leaves the guiding rail, whereby the chain of stitching is drawn taut and laterally into the path of the cutting apparatus, to sever the chain.

20. In an organized apparatus for feeding and sewing filled bags, a supporting framework, a sewing head overhanging the same, a conveying mechanism beneath the sewing head, a bag guiding rail, a cutting apparatus, means for tilting the bag as it leaves the guiding rail, to draw the chain of stitching taut and into the path of the cutting apparatus to sever the chain, and a second guiding rail to support the bag in its tilted position.

21. In an organized apparatus for feeding and sewing filled bags, a supporting framework, a sewing mechanism, a conveying mechanism beneath the sewing mechanism, a chain severing device beyond the sewing mechanism but attached thereto, and means for tilting a bag after it has passed the sewing mechanism, whereby the chain is drawn taut and into the path of the severing device.

22. In an organized apparatus for feeding and sewing filled bags, a supporting framework, a sewing mechanism, a chain severing device beyond the sewing mechanism, a conveyer belt, a table over which the same runs, and a laterally inclined tilter board between the conveyer belt and the table and arranged to tilt the bag to tighten the chain of stitching and draw it into the chain severing device.

23. In an organized apparatus for feeding and sewing filled bags, a supporting framework, a sewing mechanism, a chain severing device beyond the sewing mechanism, and a laterally inclined tilter board arranged to tilt the bag to tighten the chain of stitching and draw it into the chain severing device.

24. In an organized apparatus for feeding and sewing filled bags, a supporting framework, a sewing mechanism, a chain severing device beyond the sewing mechanism, two guiding rails in different vertical planes, and a tilter board arranged to tilt the bag when it leaves the first guide rail, and tilt it against the second guide rail, thus tightening the chain of stitching and drawing it into the chain severing device.

25. In a filled bag sewing apparatus, a framework therefor, a sewing head and a conveyer, a clipper, means whereby the bags may be tilted, said tilting means being adjustable for different sized sacks.

26. In an organized machine for feeding and sewing filled bags, a supporting framework, a sewing head thereon, a conveyer belt, and means for driving it, a supporting framework for the conveyer belt, and means for adjusting the conveyer belt, comprising vertical screw shafts engaging the conveyer belt supporting framework, and having at their upper ends gear wheels, and a horizontal hand shaft having gears meshing with said gear wheels.

27. In an organized machine for feeding and sewing filled bags, a supporting framework, a sewing head thereon, a severing mechanism, a conveying belt and an inclined board over which the conveying belt runs, for tilting the bag as it leaves the sewing mechanism and drawing the chain into the cutting or severing mechanism.

28. In a filled bag sewing apparatus, a supporting framework, a sewing head adjustable thereon, a conveyer beneath said sewing head, a clipper, a guiding rail, said clipper and guiding rail being adjustable with said sewing head.

29. In a filled bag sewing apparatus, a supporting framework therefor, a conveyer belt, a sewing head, a clipper, a plurality of guides against which the filled bags rest as they are conveyed to the sewing head and clipper, one of said guides being located behind the other.

30. In a filled bag sewing apparatus, a supporting framework therefor, a sewing head mounted above said framework, a conveyer belt arranged below said sewing head and a shaft mounted in said framework extending from the lower portion of said framework to a point above its upper surface and operating said sewing head and its conveyer belt, said sewing head and conveyer belt being vertically adjustable with respect to said shaft.

31. In a filled bag sewing apparatus, a supporting framework, a sewing head mounted above said framework, a conveyer belt arranged below said sewing head, and a shaft mounted in said frame and extending above and below the upper surface of said framework, said sewing head and said conveyer belt being vertically movable on said shaft.

32. In a filled bag sewing apparatus, a supporting framework, a sewing head mounted upon adjustable brackets, a conveyer mounted upon an adjustable bracket, a shaft extending above and below the upper surface of said framework, said conveyer and said adjustable bracket both having positive connections with said shaft and adjustable thereon.

33. In a filled bag sewing apparatus, a framework therefor, a shaft extending above and below the upper surface of the framework, a clutch carried by said shaft, means to render said clutch operative to rotate said shaft, a conveyer, a sewing head and connections between the said shaft and said conveyer and said sewing head.

34. In a filled bag sewing apparatus, a framework therefor, a sewing head, means for supporting the bags, and a guiding rail for the bags, one part of which is arranged farther from the edge of the framework than the other part.

35. In a filled bag sewing apparatus, a framework therefor, a sewing head, means for supporting the bags, and a guiding rail for the bags, one part of which is arranged farther from the edge of the framework than the other part, and a chain severing device.

36. In a filled bag sewing apparatus, a framework therefor, a sewing head, means for supporting the bags, and a guiding rail for the bags, one part of which is arranged farther from the edge of the framework than the other part, and a chain severing device arranged in such relation to the two parts of the guiding rail that as the bag leaves the one part farther from the framework, and is guided by the other part, the chain will be drawn into the path of the severing device.

37. In a filled bag sewing apparatus, a framework therefor, a sewing head, means for suporting the bags, a clipper and means whereby the bags may be tilted, said tilting means being adjustable for different sized sacks.

38. A filled bag sewing machine including in combination a supporting frame, a support for the filled bags carried by and projecting from the front of the supporting frame, a sewing head overhanging said support, stitching mechanism mounted in said sewing head for stitching the filled bags and forming a connecting line of threads between the bags, means for severing the connecting line of threads including severing members located and operating in the rear of the plane of travel of the mouth of the bag being stitched, means for continuously operating said severing members, said severing members having the receiving throat thereof opening toward the plane of travel of the mouth of the bag being stitched whereby a relative movement of the severing members and the connecting line of threads will position said line of threads between the severing members of said severing mechanism.

39. A filled bag sewing machine including in combination a supporting frame, a support for filled bags carried by and projecting from the front face of the supporting frame, a sewing head overhanging said support, stitching mechanism mounted in said sewing head for stitching the filled bags and forming a connecting chain of stitches between the bags, cutting mechanism for severing the chain of stitches including severing members located and operated wholly in the rear of the plane of travel of the mouth of the bag being stitched, and means for continuously operating said severing members, said severing members having the receiving throat thereof open toward the plane of travel of the mouth of the bag being stitched, whereby a tilting of the bag after the same has passed the stitching mechanism will position the connecting chain of stitches between the severing members.

40. In an apparatus for feeding and sewing filled bags, a supporting frame, a sewing head overhanging the same having a horizontally reciprocating needle and a feeding mechanism, a support for the filled bags beneath the sewing head, means for supporting said sewing head, including a bracket mounted on the frame, a second bracket carried by the first named bracket and supporting the sewing head, said second bracket and sewing head being slidable horizontally for bodily shifting the position of the sewing head while maintaining the horizontal reciprocating position of the needle.

In testimony whereof I affix my signature in the presence of two witnesses.

DUDLEY S. SEYMOUR.

Witnesses:
S. George Tate,
J. H. Masland.